CHARLES L. TUCKER, OF CHICAGO, ILLINOIS.

*Letters Patent No. 84,657, dated December 1, 1868.*

IMPROVEMENT IN BOXES FOR LARD, BUTTER, AND SIMILAR SUBSTANCES.

The Schedule referred to in these Letters Patent and making part of the same.

*To all whom it may concern:*

Be it known that I, CHARLES L. TUCKER, of the city of Chicago, in the county of Cook, and State of Illinois, have invented certain new and useful Improvements in Compositions for Lining or Coating Wood Boxes; and I do hereby declare that the following is a full, clear, and exact description thereof.

The nature of my invention consists in preparing a composition for lining or surfacing the interior of wood boxes, used for holding or preserving lard and other oleaginous substances, which will penetrate the wood to a certain extent, and also form an interior coating impervious to and insoluble in such substances, be cheap in its preparation, and inodorous and innoxious in use.

I make such a composition as follows:

I take two parts of flour or other starchy substance and thoroughly mix it in water, so that there will not be any lumps; I then take one part of gelatine or glue, and dissolve it in the usual way; I then pour the flour into the glue and keep it in a heated state until each is thoroughly incorporated into the other, and made a homogeneous mass; I then add two parts of earthy matter, such as terra-alba, kaolin, pulverized or calcined gypsum, &c., thoroughly mix them, and reduce them by water to a proper consistency, and add about one-fiftieth part per quantity of glycerine, the other parts being by weight.

The composition is applied to the boxes warm or in a heated condition.

It will be found an excellent composition for lard-boxes; also, for those which are to be filled with butter, as it is not injuriously affected by the small portion of salt water or buttermilk always found to remain in butter, and which destroys coatings or surfacings made from the soluble gums and similar articles.

When the boxes are ready, this composition is applied by a sprinkler placed in the box, or by any other convenient mode, and, as it is applied hot, a portion of it will penetrate the wood, and the solid particles remain upon its surface and form a coating, which is insoluble either in oil or water, to resist the action of the contents of such box, and to strengthen the box, which is desirable when the box is made of thin material, such as veneer.

The proportions here given may be varied to a considerable extent. Those given are those which I consider best in ordinary use.

Having thus fully described my invention,

What I claim as new, and desire to secure by Letters Patent, is—

1. As a new article of manufacture, a box for packing lard, butter, and other similar substances, made by coating wood, pasteboard, or other suitable material, with a stiffening cement of glue and starch, with or without earthy materials, substantially as described.

2. A cement for preparing boxes composed of glue or gelatine, combined with starch or its equivalent, with or without the addition of earthy materials, as described.

CHARLES L. TUCKER.

Witnesses:
    L. L. BOND,
    EDM. F. BROWN.